No. 725,837. PATENTED APR. 21, 1903.
W. GMEINER.
HOSE CLAMP.
APPLICATION FILED DEC. 13, 1902.
NO MODEL.

Witnesses
W. Gmeiner, Inventor:
by C. A. Snow & Co.
Attorneys

UNITED STATES PATENT OFFICE.

WILLIAM GMEINER, OF PITTSBURG, KANSAS, ASSIGNOR OF ONE-HALF TO WILLIAM J. KAEMERLING, OF PITTSBURG, KANSAS.

HOSE-CLAMP.

SPECIFICATION forming part of Letters Patent No. 725,837, dated April 21, 1903.

Application filed December 13, 1902. Serial No. 135,124. (No model.)

*To all whom it may concern:*

Be it known that I, WILLIAM GMEINER, a citizen of the United States, residing at Pittsburg, in the county of Crawford and State of Kansas, have invented a new and useful Hose-Clamp, of which the following is a specification.

This invention has relation to means for closing a leak in a hose or strengthening a weak part therein and for use upon a hose-pipe or other means where its employment may be deemed desirable.

It is the object of the invention to provide such improvements in hose-clamps as will enhance their serviceability and simplify their construction and mode of operation.

To these ends my invention consists of an improved hose-clamp as a whole comprising a new article of manufacture and of improved combination of parts of a hose-clamp, one form of the said hose-clamp and combinations of parts embodying the invention being shown in the annexed drawings, forming a part of this specification, to which reference is had, it being understood, however, that changes may be made in the form and arrangement of the essential parts or some of them without departing from the nature or spirit of the invention.

Figure 1:
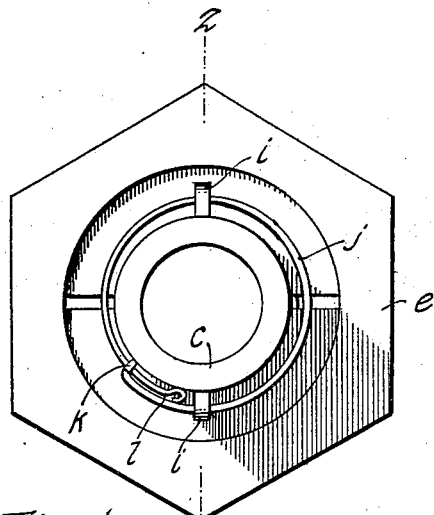
Figure 2:
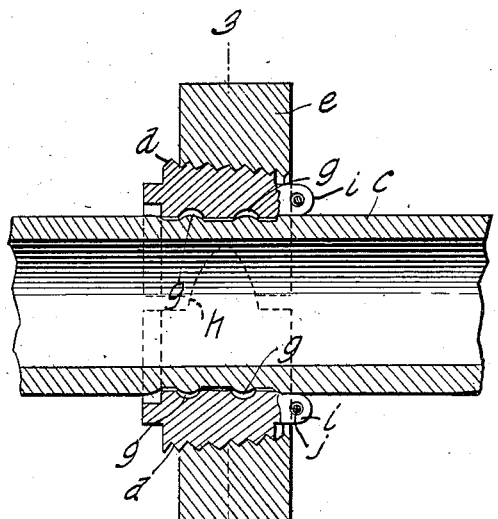
Figure 3:
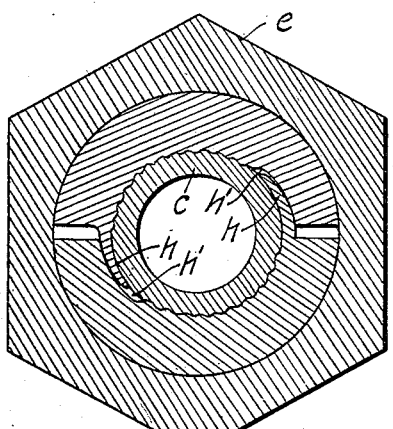
Figure 4:
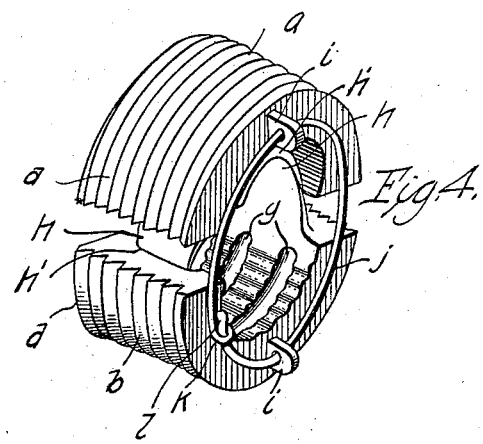

In the drawings, Figure 1 is a side elevation of my invention, showing it as secured upon a section or piece of hose-pipe. Fig. 2 is a longitudinal sectional view taken on the line 2 2 of Fig. 1. Fig. 3 is a cross-section taken on the line 3 3 of Fig. 2. Fig. 4 is a perspective view of the two clamping members proper detached from the hose and clamping-nut.

Similar letters designate similar parts or features, as the case may be, wherever they occur.

In the drawings, $a$ $b$ are two members which, taken together, form the clamp proper. Each of the said members forms substantially one-half of the clamp, which is constructed to be placed upon the hose $c$ and fit therearound.

Externally at one end the clamp proper is slightly tapered in form and is screw-threaded, as at $d$, to receive thereon a clamping-nut $e$, correspondingly screw-threaded on its interior. Compounded with the other end of the clamp is a nut $f$, for a purpose to be presently explained. Interiorly the clamping members are provided with shallow annular grooves $g$ in order that the said members may be clamped upon the hose with greater firmness, and so pack the same more securely against leakage.

Each member is provided on one of its edges with a wedge-shaped tab or projection $h$, adapted to fit in a corresponding recess $h'$, formed on the interior of the opposite member, when the two are brought together.

Projecting laterally from the screw end of each member is a perforated stud $i$, through which a split ring of wire $j$ extends. The said wire ring has an eye $k$ formed on one of its ends, so that the other end may be passed therethrough, extend some distance therebeyond, and itself be formed into an eye or loop $l$ to prevent it from accidentally slipping back through the eye $k$. These means are provided for the purpose of keeping the two members from being independently separated in the course of the application of the device to use in a hose or in handling the members at other times and at the same time permitting them to be parted sufficiently to be readily slipped upon the hose, and yet not hinder the two members from being clamped as tightly as may be on the hose. The practical effect of constructing the wire ring as described is to render it adjustable as to its circumference to suit circumstances.

In operation, supposing the hose to be leaking at a point or that for any reason it may be desired to apply the clamp at any point on the hose, the clamping-nut $e$ may be removed, and the two members loosely connected by the wire ring $j$ may be slipped on the hose to the desired point and closed thereon, care being taken that the tab or projection $h$ on each member enters the recess $h'$ of the opposite member. The clamping-nut may be likewise slipped on the hose and started on the screw-threaded end of the clamp by hand, if possible. Then by applying a wrench or spanner to the clamping-nut and a similar device to the nut $f$, compounded with the clamp, the latter may be held and the clamping-nut turned upon its screw, which, owing to the tapered form of the screw-threaded end of the clamp, will close or squeeze the members upon the hose as tightly as serviceability may require. The gradually-inclined or wedge-shaped projections entering the similarly-inclined opposite recesses furnish a substantially smooth and continuous surface to bear upon the hose and reinforce it or close leaks.

It may be noted that the split iron ring and the studs to which it is attached are parts or features which constitute a matter of convenience rather than necessity.

Having thus described the invention, what I claim is—

1. A device comprising two clamp members adapted to embrace the member with which they are to coact and being tapered and screw-threaded externally, one of the clamp members being provided with a recess in its inner wall gradually inclined inward from the edge of the member and the other with an inclined projection to enter the recess, and a nut operating upon the threaded portion.

2. A device comprising two clamp members adapted to embrace the member with which they are to coact and being tapered and screw-threaded externally, each of the clamp members being provided with a recess at one of its edges in its inner wall gradually inclined inward from the edge of the member, and an inclined projection at its opposite edge, said recess and projection coöperating, respectively, with a similar projection and recess of the companion member.

3. A hose-clamp comprising in its construction two members or halves adapted to fit around the hose, having one end tapered and screw-threaded, each member being provided with a wedge-shaped projection on one edge and the opposite member provided with a corresponding recess on its adjacent edge to receive the projections, combined with a nut adapted to be turned on the tapered screw-threaded end.

4. A hose-clamp comprising in its construction two members or halves adapted to fit around the hose, having one end tapered and screw-threaded, each member being provided with a wedge-shaped projection on one edge and the opposite member provided with a corresponding recess on its adjacent edge, grooves formed in its inner surface, combined with a nut adapted to be turned on the screw-threaded tapered end.

5. A hose-clamp comprising in its construction two members or halves adapted to fit around the hose, each member being provided with a perforated lug, and a split adjustable ring passed through the perforations of the studs to loosely hold the members together, and means for clamping the members on the hose.

In testimony that I claim the foregoing as my own I have hereto affixed my signature in the presence of two witnesses.

WILLIAM GMEINER.

Witnesses:
   JAS. B. SMITH,
   STELLA TOPE.